United States Patent
Brodoway et al.

(10) Patent No.: US 9,409,463 B2
(45) Date of Patent: Aug. 9, 2016

(54) VEHICLE STRUCTURAL MEMBER AND BRACKET

(71) Applicant: Honda Motor Co., Ltd., Tokyo (JP)

(72) Inventors: Nathaniel Taylor Brodoway, Columbus, OH (US); Timothy J. Palesano, Marysville, OH (US); Bradley J. Smith, Marysville, OH (US); Andrew K. Swayne, Dublin, OH (US); Nick A. Massaro, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/565,578

(22) Filed: Dec. 10, 2014

(65) Prior Publication Data

US 2016/0167489 A1    Jun. 16, 2016

(51) Int. Cl.
*B60J 3/00* (2006.01)
*B60J 3/02* (2006.01)

(52) U.S. Cl.
CPC ...................................... *B60J 3/0217* (2013.01)

(58) Field of Classification Search
CPC .............................. B60J 3/0213; B60J 3/0217
USPC .............. 296/97.9, 187.05, 214, 192, 187.04; 280/748
See application file for complete search history.

(56) References Cited

U.S. PATENT DOCUMENTS

| | | | |
|---|---|---|---|
| 2,356,934 A | 8/1944 | Ketcham | |
| 5,653,496 A | 8/1997 | Mori et al. | |
| 6,042,176 A * | 3/2000 | Ikeda | B60J 3/0217 188/371 |
| 6,126,230 A | 10/2000 | Ikeda et al. | |
| 6,568,749 B2 | 5/2003 | Sawayanagi et al. | |
| 6,679,538 B1 * | 1/2004 | Sturt | B60J 3/0217 296/187.05 |
| 6,869,119 B2 | 3/2005 | Ito et al. | |
| 7,296,850 B2 | 11/2007 | Kaneda et al. | |
| 7,478,866 B2 | 1/2009 | Kim | |
| 7,758,109 B2 | 7/2010 | Reed et al. | |
| 2009/0206218 A1 | 8/2009 | Massey | |
| 2014/0138986 A1 * | 5/2014 | Tsuneyama | B62D 25/163 296/187.09 |

* cited by examiner

*Primary Examiner* — Dennis H Pedder
(74) *Attorney, Agent, or Firm* — Rankin, Hill & Clark LLP

(57) ABSTRACT

A vehicle structural member includes an outer member and an inner member secured to the outer member with a hollow cavity defined between the inner member and the outer member. The vehicle structural member further includes a bracket disposed in the hollow cavity and fixedly secured to the inner member for mounting an auxiliary component to the inner member. The bracket includes a main portion and at least one leg fixedly connecting the main portion to the inner member. The at least one leg includes a bulging portion enabling deformation of the bracket when a force is applied to the main portion of the bracket.

20 Claims, 7 Drawing Sheets

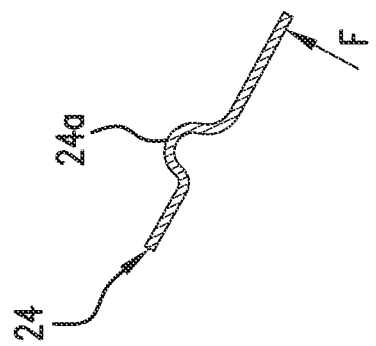
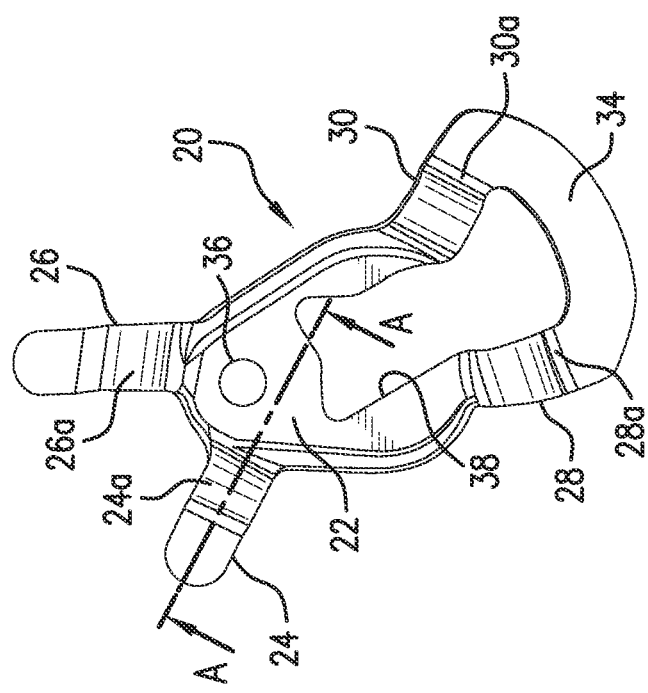

VEHICLE STRUCTURAL MEMBER AND BRACKET

BACKGROUND

Vehicles include numerous structural members comprising the frame or body. Most of these structural members include an outer member and an inner member secured to the outer member, such as by welding, to define a hollow cavity between the outer and inner members. Such structural members on vehicles often include side sill members, cross beam members extending between the side sill members, vertical pillar members (e.g., A-pillar, B-pillar, etc.) and/or roof rail members, including those extending parallel to the side sill members and those extending laterally across the vehicle. One such laterally extending roof rail member is the front roof rail, which defines a forward-most and upward extent of the passenger compartment for the vehicle.

In assembled vehicles, there are often various objects or auxiliary components that are attached to the structural body of the vehicle. Typically, such auxiliary components are attached directly to the parts comprising the structural body using attachments that are applied during general assembly of the vehicle. Sometimes these auxiliary components need to exhibit particular deformation characteristics in order to increase occupant safety within the vehicle. Examples of these types of auxiliary components include sunvisors, grab handles, etc. To achieve the desired deformation characteristics, the auxiliary components are often connected to the structural body via a hat-bracket and/or using relief cutouts. Accordingly, if impact occurs with the auxiliary component, such as during a crash event, the auxiliary component can deform in a predetermined manner due to the hat-bracket, relief cutout or other feature. Sometimes, particular vehicle configurations are not suitable for use with hat-brackets and/or relief cutouts. For example, these may not allow for sufficient deformation, the mounting location may not be movable as may be required in order to use a hat-bracket and/or the cross section of the roof rail may be such that it cannot be reduced sufficiently to allow or accommodate the height of a conventional hat-type bracket.

SUMMARY

According to one aspect, a vehicle structural member includes an outer member and an inner member secured to the outer member with a hollow cavity defined between the inner member and the outer member. The vehicle structural member further includes a bracket disposed in the hollow cavity and fixedly secured to the inner member for mounting an auxiliary component to the inner member. The bracket includes a main portion and at least one leg fixedly connecting the main portion to the inner member. The at least one leg includes a bulging portion enables deformation of the bracket when a force is applied to the main portion of the bracket.

According to another aspect, a roof rail on a vehicle includes an outer member and an inner member welded to the outer member to form a closed-profile structural member. The roof rail further includes a bracket disposed within the closed-profile structural member and joined to the inner member for mounting an auxiliary component to the closed-profile structural member. The bracket includes a main portion and at least one leg extending outward from the main portion for being joined to the inner member. The at least one leg includes a bulging portion for deforming when a force is applied to the main portion of the bracket.

According to a further aspect, a bracket for mounting an auxiliary component to a structural member on a vehicle includes a main portion, at least one leg and a bulging portion. The at least one leg extends outward from the main portion for connecting the main portion to the structural member. The bulging portion is disposed along the at least one leg to permit deformation when a force is applied to the main portion.

BRIEF DESCRIPTION OF THE DRAWINGS

FIG. 5 is an isolated perspective view of the bracket.

FIG. 6 is a partial cross-sectional view taken along the line A-A of FIG. 5.

DETAILED DESCRIPTION

Figure 1:
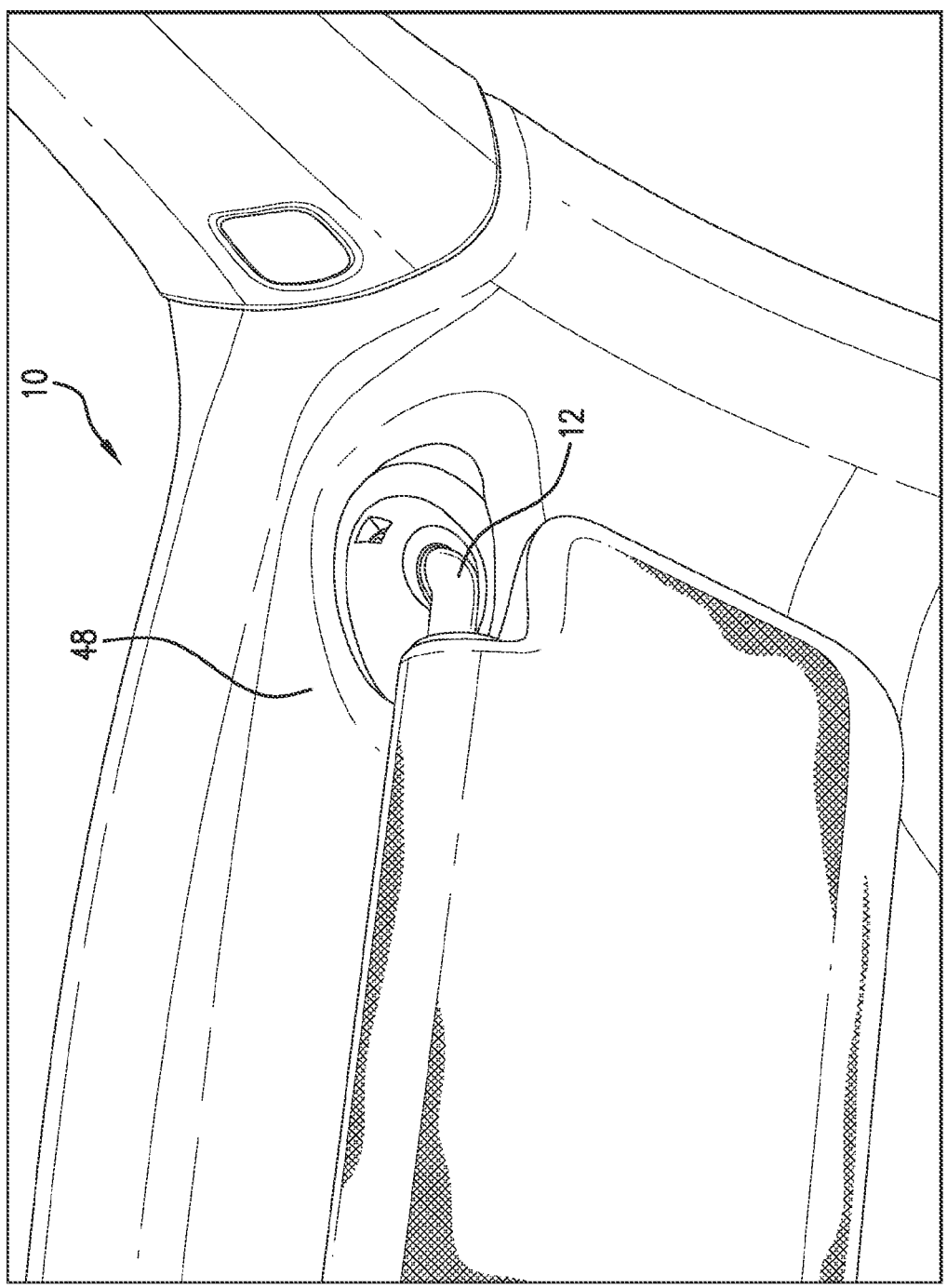
FIG. 1 is a partial perspective view of a structural member (e.g., a front roof rail) for a vehicle having an auxiliary component (e.g., a sunvisor) mounted thereto according to an exemplary embodiment.
Figure 2:
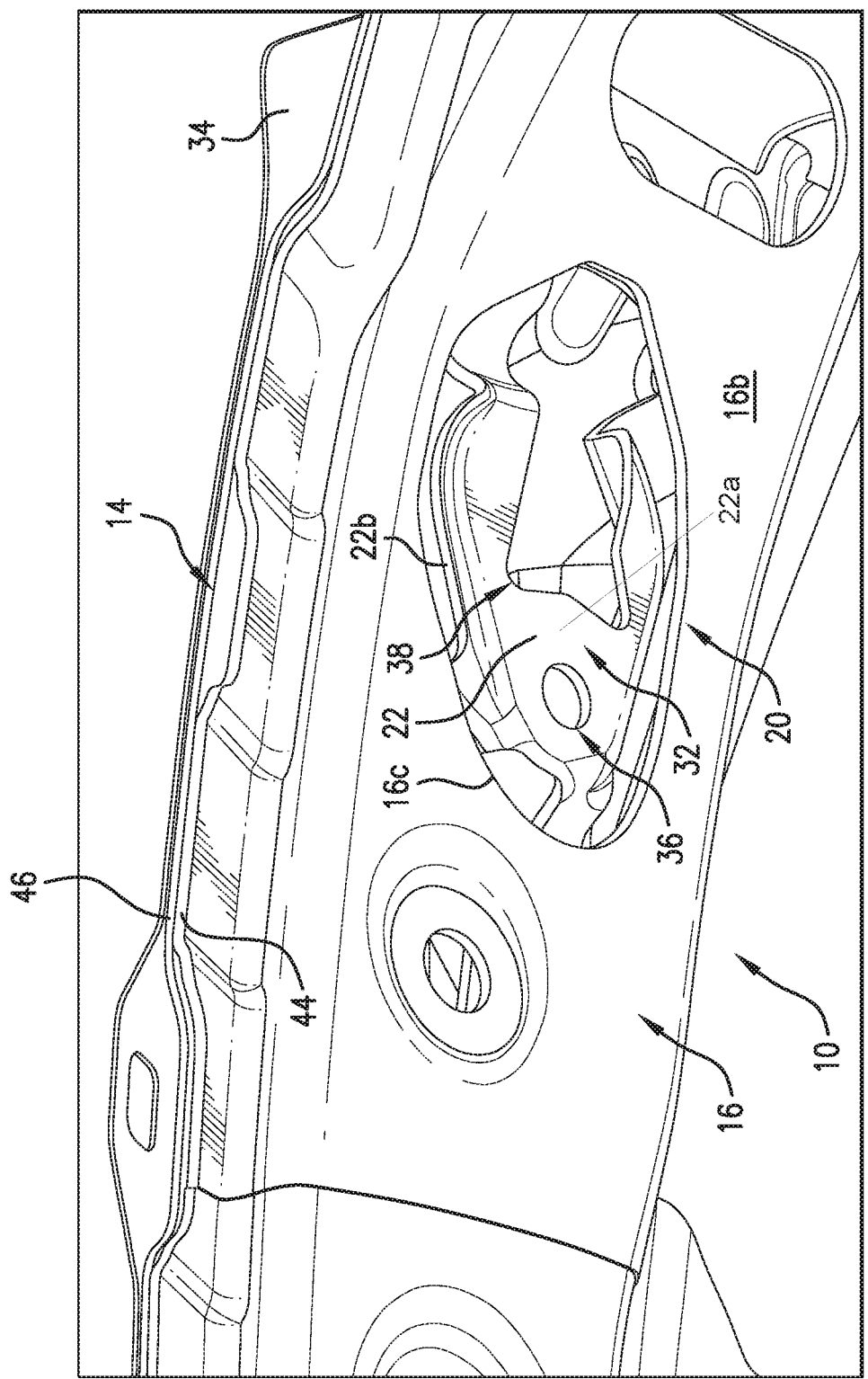
FIG. 2 is a view similar to FIG. 1 but shown with the sunvisor and a headliner removed to reveal a bracket disposed within the structural member.

Referring now to the drawings wherein the showings are purposes of illustrating one or more exemplary embodiments and not for purposes of limiting the same, FIGS. 1-2 illustrate a vehicle structural member 10 to which an auxiliary component in the form of sunvisor 12 is fixedly mounted. The vehicle structural member 10 includes an outer member 14 and an inner member 16 secured or joined to the outer member 14 with a hollow cavity 18 (FIG. 7) defined between the outer member 14 and the inner member 16. In the illustrated embodiment, the outer member 14 and the inner member 16 are arranged as a front roof rail on a vehicle, though this is not required. As is known by those skilled in the art, attachment of the inner member 16 to the outer member 14 can be via welding such that the inner member 16 is joined (e.g., welded) to the outer member 14 to form the structural member 10 as a closed-profile structural member. The vehicle structural member 10 further includes a bracket 20. As shown in FIG. 2, the bracket 20 is disposed within the structural member 10 between the outer member 14 and the inner member 16 and thus within the hollow cavity 18. The bracket 20 is fixedly secured or joined to the inner member 16, such as via welding, for mounting the auxiliary component 12 (i.e., sunvisor 12) to the structural member 10, and particularly to the inner member 16.

Figure 3:
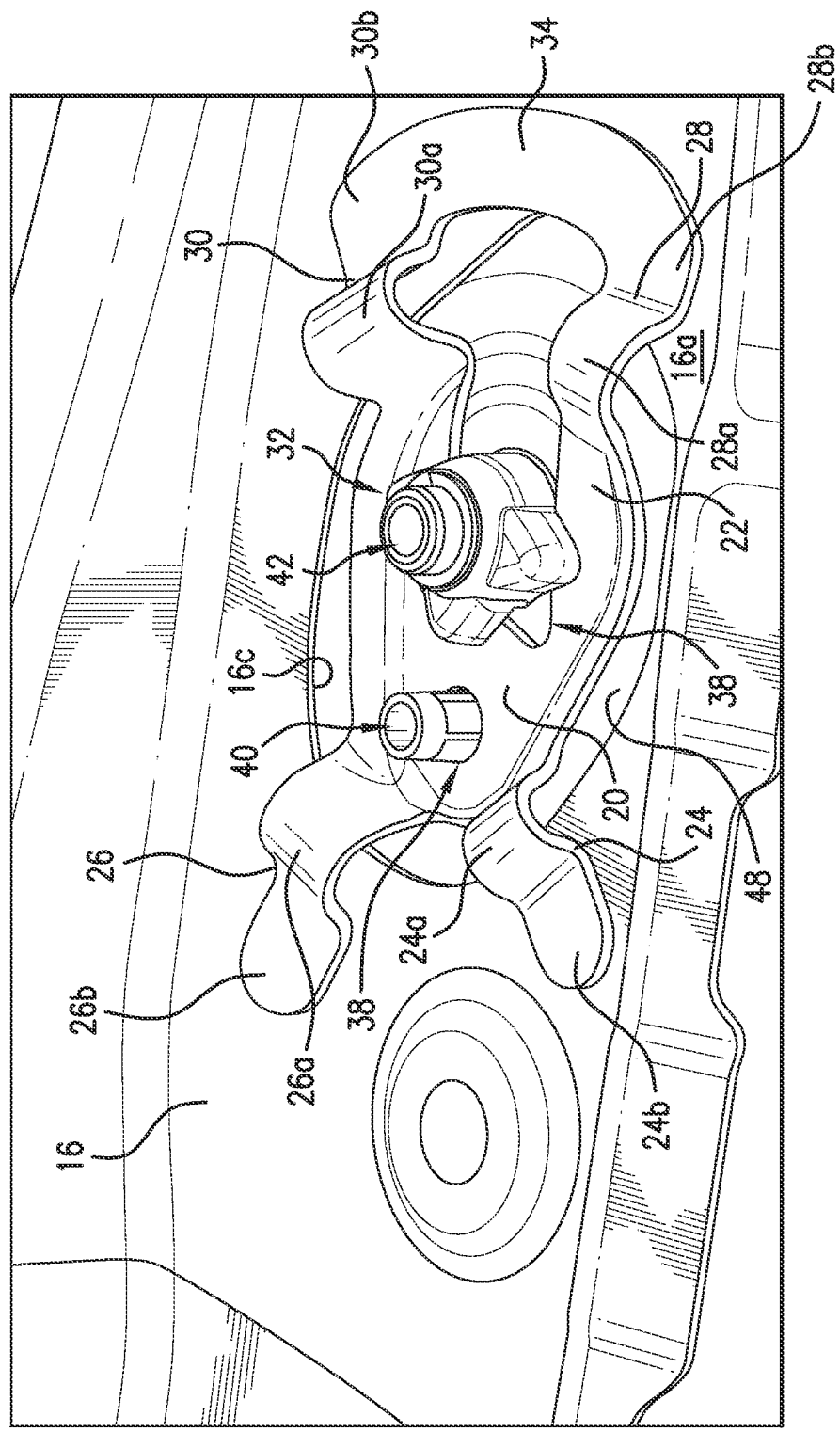
FIG. 3 is an internal view showing the sunvisor mounted to the bracket and the bracket mounted to an inner member of the structural member.
Figure 4:
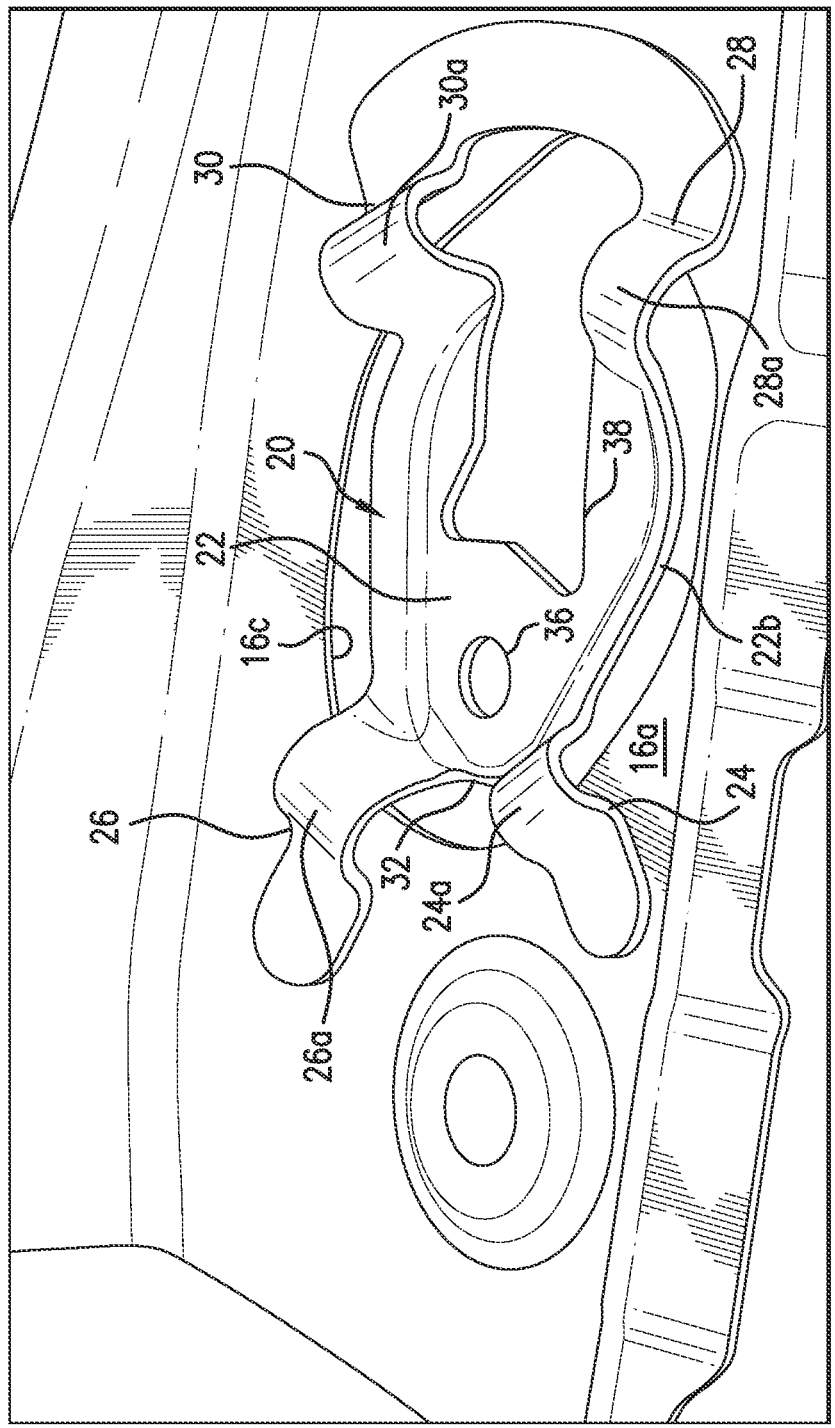
FIG. 4 is a view similar to FIG. 3 but shown with the sunvisor removed from the bracket.

With further reference to FIGS. 3, 4 and 5, the bracket 20 includes a main portion 22 and at least one leg (i.e., legs 24, 26, 28, 30 in the illustrated embodiment) extending outward from the main portion 22 for connecting the main portion 22 to the structural member 10. More specifically, the at least one leg connects the main portion 22 to the inner member 16. The fixed connection between the at least one leg and the inner member 16 can be via welding. As will be described in more detail below, the at least one leg (each of the legs 24-30 in the illustrated embodiment) includes a bulging portion (i.e., bulging portions 24a, 26a, 28a, 30a in the illustrated embodiment)

enabling deformation of the bracket 20 when a force is applied (such as orthogonally) to the main portion 22 of the bracket 20 from an underside of the structural member 10 (i.e., into the bracket as shown in FIG. 2). In an exemplary embodiment, the bulging portion can be constructed as shown so that deformation generally only occurs when an orthogonal force (e.g., force F in FIG. 6 that is orthogonal to the main portion 22) is applied to the main portion 22.

The inner member 16 has an inner surface 16a and an outer surface 16b. The inner surface 16a faces the outer member 14 and the outer surface 16b faces away from the outer member 14b. As best shown in FIGS. 3 and 4, the bracket 20 is fixedly secured to the inner member 16 via the at least one leg (legs 24, 26, 28 and 30 in the illustrated embodiment) having a distal end overlaying the inner surface 16a of the inner member 16. In the illustrated embodiment, the at least one leg is a plurality of legs (i.e., legs 24-30) each having a distal end being overlain onto and fixed to the inner surface 16a of the inner member 16 and each having the bulging portion (i.e., bulging portions 24a-30a) enabling preferred or predetermined deformation of the bracket 20. The bulging portion (e.g., bulging portions 24a-30a) can be a generally curved section that projects away from the distal end, the main portion 22 and the inner member 16. The bulging portion provides excess material for enabling preferred deformation characteristics for the bracket 20. In one embodiment, the plurality of legs includes at least three legs circumferentially spaced around the main portion 22.

In the illustrated embodiment, the plurality of legs is four legs, including legs 24, 26, 28 and 30, with these legs 24-30 circumferentially spaced apart from one another around the main portion 22. The legs 24-30 each include, respectively, a distal tab or end 24b, 26b, 28b, 30b that overlays onto and is fixed (e.g., via welding) to the inner surface 16a of the inner member 16. The bulging portions 24a-30a of the legs 24-30 each extend in a direction away from the inner member 16 and toward the outer member 14. In the illustrated embodiment, each of the legs 24-30 has a generally uniform thickness from, respectively, the distal end 24b-30b to the main portion 22. As used herein, the thickness of the legs 24-30 is a dimension extending orthogonally from the inner surface 16a of the inner member. For example, the leg 30 has a thickness dimension T shown in FIG. 7 that is generally uniform along the leg 30 from the distal end 30b thereof through the bulging portion 30a and to the main portion 22. Moreover, the uniform thickness of the legs 24-30 can be the same thickness as that of the main portion 22.

Also in the illustrated embodiment, the legs 28 and 30 are connected to one another at their distal ends 28b and 30b. In particular, a bridge portion 34 can extend between the distal ends 28b, 30b to connect the legs 28, 30. In the illustrated embodiment, the bridge portion 34 overlays onto and is fixed (e.g., via welding) to the inner surface 16a of the inner member 16 in the same manner as the distal ends, 24b, 26b, 28b and 30b. The bridge portion 34 can also have the same generally uniform thickness as the legs 24-30 and, as shown, can have a curved shape, such as projecting convexly away from the main portion 22.

Figure 7:
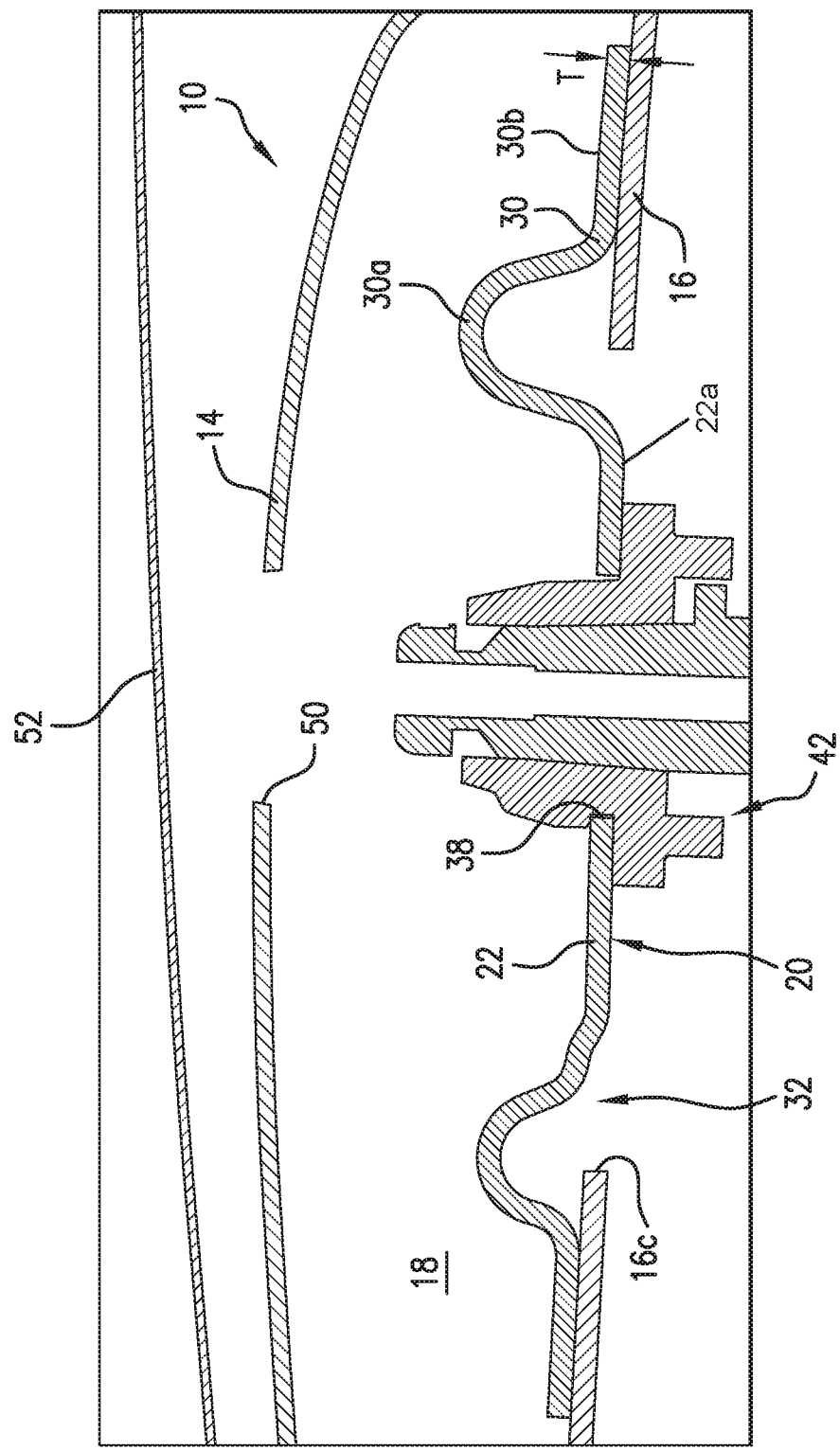
FIG. 7 is a cross-sectional view through one of the attachment locations at which the sunvisor is secured to the bracket.

As best shown in FIGS. 2 and 7, an outer surface 22a of the main portion 22 of the bracket 20 is arranged so as to be generally co-planar with the outer surface 16b of the inner member 16 and therefore does not protrude beyond the outer surface 16b of the inner member 16. As shown, the outer surface 22a of the main portion 22 of the bracket 20 faces outward (i.e., away from the outer member 14) together with the outer surface 16b of the inner member 16. More particularly, the inner member 16 has a bracket aperture 32 defined therethrough in which the main portion 22 of the bracket 20 is accommodated. As arranged in the illustrated embodiment, the main portion 22 does not extend beyond the inner member 16 and instead is coplanar with the inner member 16. More particularly, the inner member 16 includes the bracket aperture 32 in which the main portion 22 of the bracket 20 is accommodated so as to be accessible from a same side of the inner member 16 on which the outer surface 16b is disposed. As arranged or accommodated within the bracket aperture 32, a peripheral edge 22b of the main portion 22 of the bracket 20 is spaced apart from an aperture edge 16c of the inner member 16 defining the bracket aperture 34.

The main portion 22 can define at least one mounting aperture to which the auxiliary component (e.g., the sunvisor 12) mounts. In the illustrated embodiment, the main portion 22 defines a pair of mounting apertures 36, 38 that accommodate mounting features 40, 42 of the sunvisor 12. In the illustrated embodiment, the mounting aperture 36 is a circular throughhole and the mounting aperture 38 is a partial star-shaped slot, though it is to be appreciated that other shapes for the mounting apertures can be used. The particular mounting apertures 36, 38 depicted in the illustrated embodiment correspond to the mounting features 40, 42 associated with the sunvisor 12. Those skilled in the art will readily recognize that other types, shapes and numbers of mounting apertures can be used according to the particular sunvisor 12 (and its mounting features) employed and/or as would be appropriate to mount some other type of auxiliary component (e.g., grab handle, etc.).

As shown in FIG. 7, the outer member 14 can include a cutout or aperture 50 that permits deformation of the feature 42 into and/or through the outer member 14 without contact occurring between the feature 42 and the outer member. A roof panel 52 is secured over the outer member 14 as is known by those skilled in the art. Accordingly, the aperture 50 remains hidden from view while providing the intended effect (i.e., allowing a greater amount of deformation before any contact).

To assemble the structural member 10, the bracket 20 is fixedly secured to the inner member 16. This can occur before the inner member 16 is secured to the outer member or after the inner member 16 is secured to the outer member. Typically, the inner and outer members 14, 16 are secured to one another by welding mating flanges together, such as flanges 44, 46 shown in FIG. 2, to form the structural member 10 as a closed-profile structural member defining the hollow cavity 18 therebetween. In particular, the legs 24, 26, 28 and 30 are overlaid onto the inner surface 16a of the inner member as shown in FIG. 4 and then can be welded to the inner member 16. As mentioned, the four legs 24-30 are spaced apart from one another about the peripheral edge 22b of the main portion 22 of the bracket 20. By this arrangement, the respective bulging portions 24a, 26a, 28a, 30a of the legs 24-30 project away from the inner member 16. Particularly, the distal ends 24b, 26b, 28b, 30b are overlain onto the inner surface 16a of the inner member 16 and it is the distal ends 24b-30b that are secured, such as by welding, to the inner surface 16a of the inner member 16.

Once the bracket 20 is attached to the inner member 16 and the inner member 16 is secured to the outer member 14, a headliner 48 (shown in FIGS. 1 and 3) can be attached to the outer surface 16b of the inner member 16 as is known. Attachment of the headliner 48 will generally occur after the structural member 10 is installed as part of the vehicle frame or body and thus typically occurs during assembly of the vehicle in which the structural member 10 is disposed. With the headliner 48 in position, the auxiliary component, which is the sunvisor 12 in the illustrated embodiment, can be secured to the bracket 20 via installation of the mounting features 40, 42 within their respective mounting apertures 36, 38. In particular, by way of example, the sunvisor can be located and temporarily set with the feature 40. Then, the feature 42 can be rotated to be in alignment or registry with the mounting aperture 38 to allow for installation within the bracket 20 and then rotated again to the position shown in FIG. 3 to axially lock sunvisor 12 in position.

Figure 8:
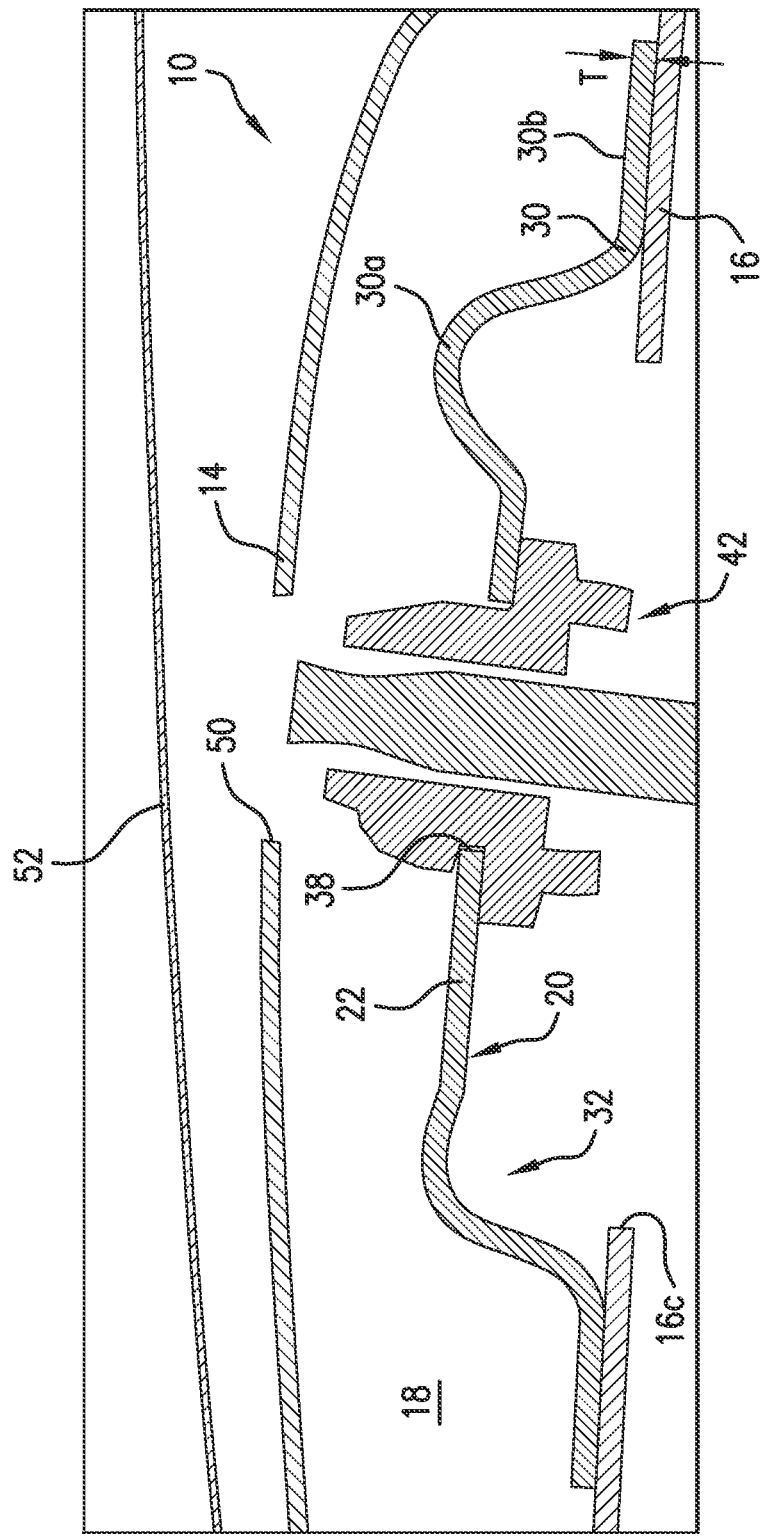
FIG. 8 is a cross-sectional view similar to FIG. 7 but showing the bracket in a deformed state.

By this arrangement, during a crash event, when an object strikes the sunvisor 12 and/or the area at which the sunvisor 12 is mounted to the structural member 10, the bracket 20 permits deformation as shown in FIG. 8 while structural integrity of the inner member 16 is maintained. In particular, the bulging portions 24a-30a of the legs 24-30 on the bracket 20 permit deformation when a force is applied to the main portion 22 of the bracket 20 (e.g., orthogonally or approximately orthogonally at or near the main portion 22). Optionally, when the outer member 14 includes the aperture 50 to accommodate the mounting feature 42, greater deformation is allowed without the mounting feature 42 engaging or contacting the outer member 14. This permits full deflection or deformation of the sunvisor 12.

Advantageously, by this arrangement, desired deformation characteristics are achieved without any alteration to the footprint of the structural member 10. More particularly, having the bracket 20 fully accommodated between the outer and inner members 14, 16 enables the footprint of the structural member 10 to remain constant while providing desired deformation in the event of a crash event where an impact force is applied in one direction against or toward the bracket 20, while at the same time maintaining overall structural rigidity and integrity of the inner member 16. Particularly, the bulging portion 24a-30a on the legs 24-30 allows for the bracket 20 to bend. In contrast, if the legs 24-30 were flat (i.e., did not include the bulging portions 24a-30a), the material of the bracket 20 would be required to stretch. This would be undesirable as stretching requires much more force to achieve the same amount of deformation that bending does.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle structural member, comprising:
an outer member;
an inner member secured to the outer member with a hollow cavity defined between the outer member and the inner member; and
a bracket disposed in the hollow cavity and fixedly secured to the inner member for mounting an auxiliary component to the inner member, the bracket including a main portion and at least one leg fixedly connecting the main portion to the inner member, the at least one leg including a bulging portion enabling deformation of the bracket when a force is applied to the main portion of the bracket,
wherein the inner member has a bracket aperture defined therethrough in which the main portion of the bracket is accommodated, and the outer member includes an aperture aligned with the bracket aperture.

2. The vehicle structural member of claim 1 wherein the outer member and the inner member are arranged as a front roof rail on a vehicle.

3. The vehicle structural member of claim 1 wherein the inner member has an inner surface and an outer surface, the bracket fixedly secured to the inner member via the at least one leg having a distal end overlaying the inner surface of the inner member.

4. The vehicle structural member of claim 3 wherein an outer surface of the main portion of the bracket is arranged so as to be generally co-planar with the outer surface of the inner member and not protrude beyond the outer surface of the inner member, and wherein the bulging portion enables deformation of the bracket only when an orthogonal force is applied to the main portion of the bracket.

5. The vehicle structural member of claim 4 wherein the main portion of the bracket is accessible from a same side of the inner member on which the outer surface is disposed.

6. The vehicle structural member of claim 4 wherein the bulging portion extends in a direction away from the main portion and away from the inner member.

7. The vehicle structural member of claim 1 wherein the at least one leg is a plurality of legs each having a distal end being overlain onto and fixed to an inner surface of the inner member and each having the bulging portion enabling deformation of the bracket.

8. The vehicle structural member of claim 7 wherein the plurality of legs includes at least three legs circumferentially spaced around the main portion.

9. The vehicle structural member of claim 1 wherein the bulging portion extends in a direction away from the inner member.

10. The vehicle structural member of claim 1 wherein at least one leg has a generally uniform thickness from a distal end of the at least one leg to the main portion.

11. The vehicle structural member of claim 1 wherein the main portion defines at least one mounting aperture to which the auxiliary component mounts, and wherein the auxiliary component is a sunvisor.

12. A roof rail on a vehicle, comprising:
an outer member;
an inner member joined to the outer member to form a closed-profile structural member;
a bracket disposed within the closed-profile structural member and joined to the inner member for mounting an auxiliary component to the closed-profile structural member, the bracket including a main portion and at least one leg extending outward from the main portion for being joined to the inner member, the at least one leg including a bulging portion for deforming when a force is applied to the main portion of the bracket,
wherein the inner member has an inner surface and an outer surface, and wherein the at least one leg of the bracket includes a plurality of less having distal ends overlaying the inner surface of the inner member, wherein the distal ends of two legs are connected by a bridge portion overlaying the inner surface of the inner member, the bridge portion at least partially defining a mounting aperture of the bracket.

13. The roof rail of claim 12 wherein the inner member has a bracket aperture defined therethrough in which the main portion of the bracket is accommodated, and wherein a peripheral edge of the main portion of the bracket is spaced apart from an aperture edge of the inner member defining the bracket aperture.

14. The roof rail of claim 13 wherein an outer surface of the main portion of the bracket faces outward together with the outer surface of the inner member, and wherein the outer surface of the main portion of the bracket is generally coplanar with the outer surface of the inner member.

15. The roof rail of claim 14 wherein the plurality of legs includes four legs spaced apart from one another about the peripheral edge of the main portion of the bracket.

16. The roof rail of claim 12 wherein the bulging portion projects away from the inner member and is a curved portion of the at least one leg.

17. The roof rail of claim 12 wherein the main portion defines a pair of mounting apertures that accommodate mounting features of the auxiliary component.

18. A bracket for mounting an auxiliary component to a structural member on a vehicle, comprising:
   a main portion having mounting aperture for accommodating a mounting feature of the auxiliary component;
   at least one leg extending outward from the main portion for connecting the main portion to the structural member, the at least one leg at least partially defining the mounting aperture; and
   a bulging portion disposed along the at least one leg to permit deformation when a force is applied to the main portion.

19. The bracket of claim 18 wherein the at least one leg has a generally uniform thickness with a distal tab portion for overlaying an inner member of the structural member for welded attachment thereto, and wherein the bulging portion projects away from the distal tab portion and the main portion.

20. The vehicle structural member of claim 8 wherein the main portion of the bracket defines a mounting aperture to which the auxiliary component mounts, and
   wherein distal ends of two legs are connected by a bridge portion overlaying the inner surface of the inner member, the two legs together with the bridge portion at least partially defining the mounting aperture of the bracket.

* * * * *